United States Patent Office 3,463,231
Patented Aug. 26, 1969

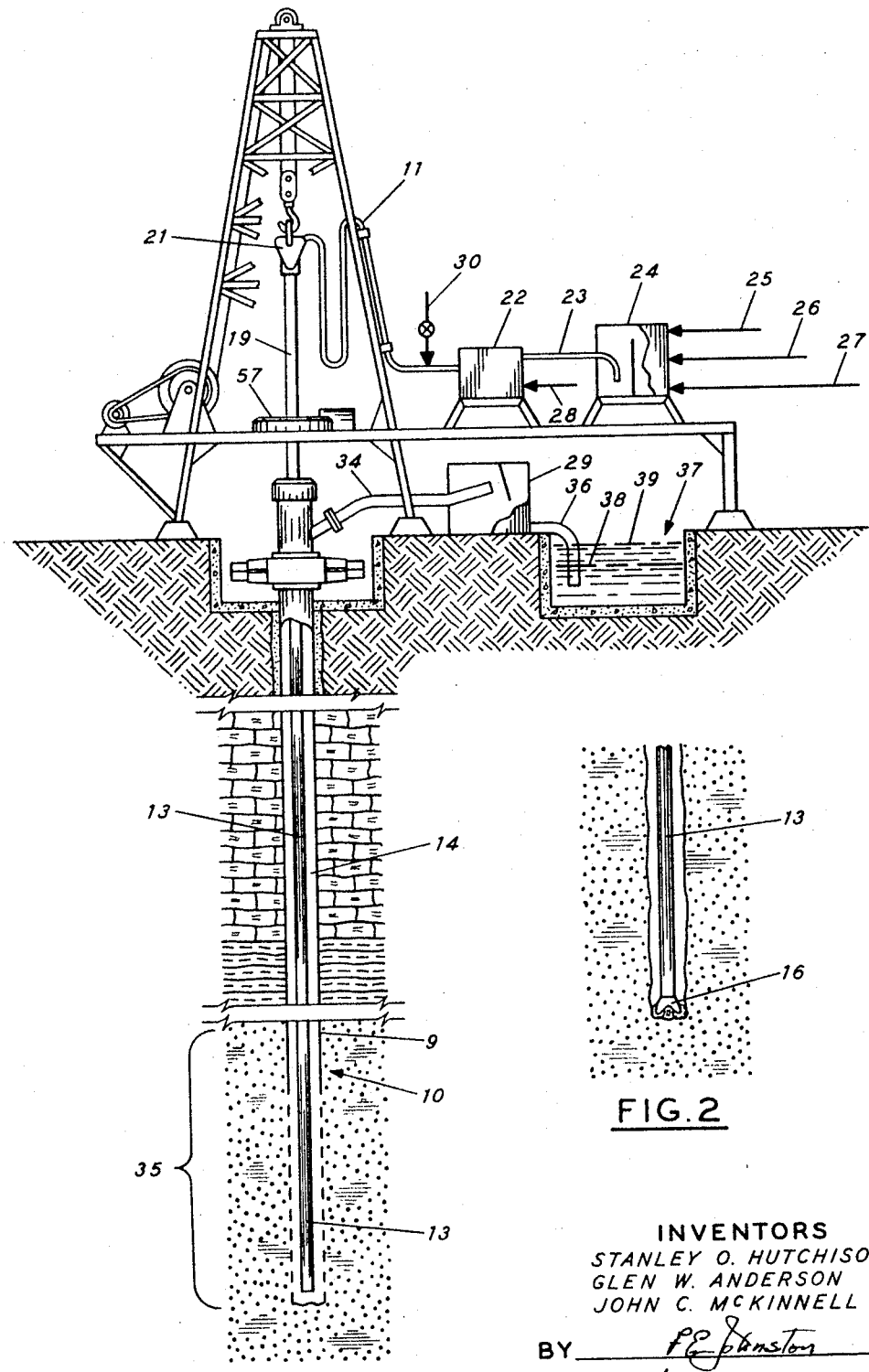

3,463,231
GENERATION AND USE OF FOAMED WELL CIRCULATION FLUIDS
Stanley O. Hutchison, Bakersfield, Glen W. Anderson, Oildale, and John C. McKinnell, Taft, Calif., assignors to Chevron Research Company, San Francisco, Calif., a corporation of Delaware
Filed Feb. 12, 1968, Ser. No. 704,832
Int. Cl. E21b 43/24, 21/00; E21c 7/06
U.S. Cl. 166—303
28 Claims

ABSTRACT OF THE DISCLOSURE

Aqueous gas-in-liquid foams are generated using a gas and an aqueous solution of a foaming agent and are used as well circulation fluids. Foaming agents having a Ross-Miles initial foam height of at least 10 centimeters yield fluids useful for circulation in a well at a moderate velocity provided that the foam has a gas-to-liquid volume ratio, standard cubic feet per gallon, respectively, in the range 3 to 50.

---

Figure 3:
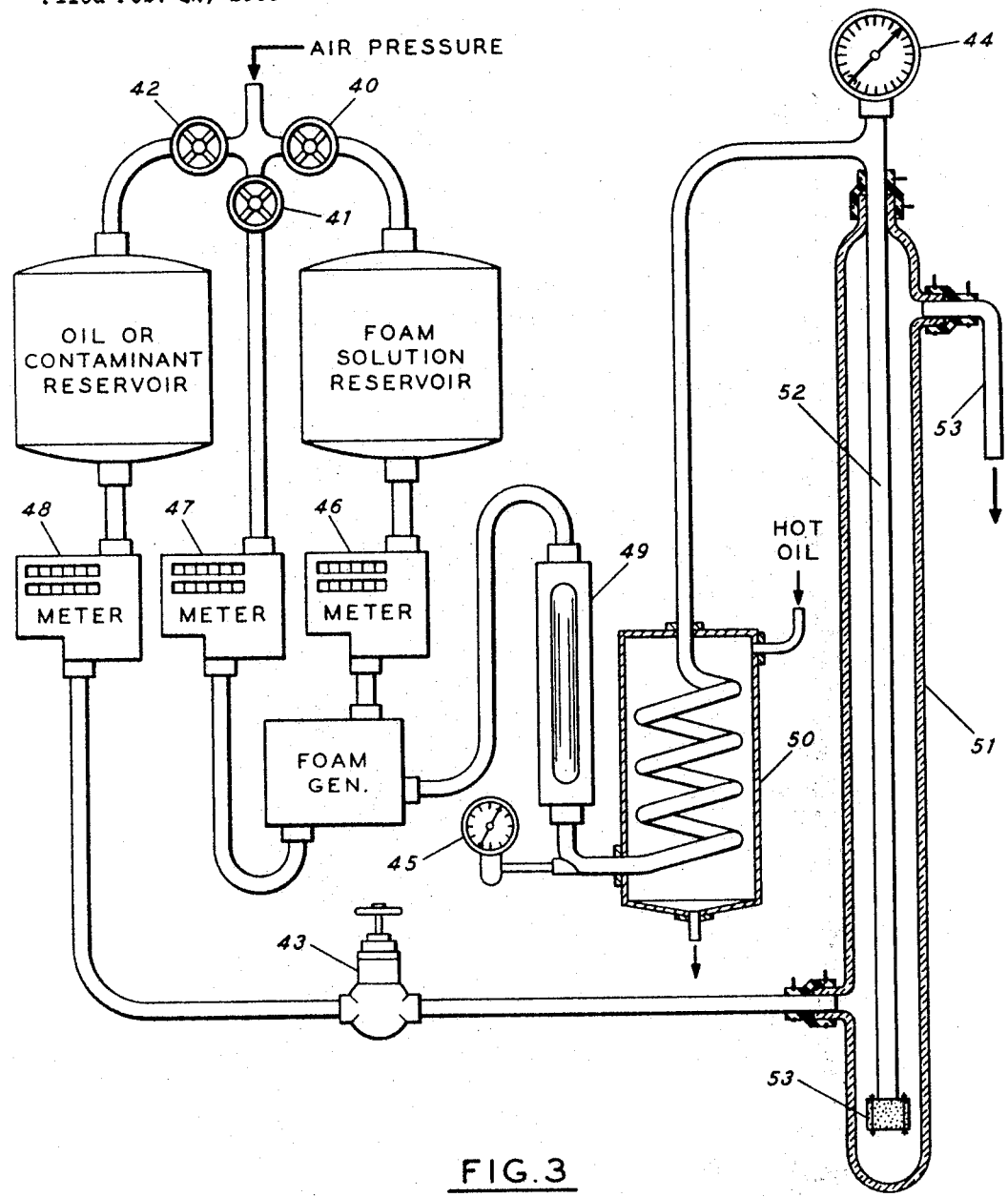

This invention relates to well circulation fluids. More particularly, it relates to low density, low velocity completion and cleanout fluids. Still more particularly, it relates to aqueous gas-in-liquid foams suitable for use as circulation fluids in wells.

It is known to use drilling muds, air, as in air-drilling, or air-foam combinations, as in air or mist drilling, as circulation fluids in the drilling or maintenance of a well. These methods have limitations and undesirable features peculiar to each. Drilling muds are in general high density materials which require substantial expenditure of energy for circulation. In well drilling etc. they are also required in large amounts. They are relatively costly. Air drilling on the other hand involved a very low density circulation fluid, i.e., a gas, but circulation velocities are high, i.e., of the order of 1,000 to 3,000 feet per minute. Hole enlargements from scouring and erosion as well as other disadvantages are experienced in this type of well operation.

It has now been found that aqueous gas-in-liquid foams prepared by the use of foaming agents are satisfactory well circulation fluids provided: (1) the foam has a gas-to-liquid volume ratio in the range from about 3–50 c.f./gal.; (2) the foam is prepared from an aqueous solution containing in parts by weight for each 100 parts of solution from about 0.005 to 10 parts of an organic foaming agent having a Ross-Miles initial foam height of at least 10 centimeters and a cumulative foam height of at least 30 centimeters; (3) the foam is circulated in the well at an annular velocity in the range from about 0 to 600 feet per min.; and (4) further provided that the foam is preformed.

Surprisingly, preformed foams of the present invention, that is foams as defined above which have been prepared out of contact with the well environment, are in general effective well circulation fluids. They are useful as low velocity carriers for the removal of solids and/or liquids from a well bore including use as in drilling and/or cleaning or the like of a well. The low density foams herein are relatively easy to circulate. They are relatively inexpensive to produce. These and other advantages will be appreciated and understood from the description and examples to follow.

By a Ross-Miles initial foam height is meant the initial or zero time foam height as obtained in the standard Ross-Miles foam analysis method (cf. Ross, J., and Miles, G. D., "An Apparatus for Comparison of Foaming Properties of Soaps and Detergents," Oil and Soap, volume 18, 1941, pp. 99–102, and McCutcheon, J. W., Synthetic Detergents, McNair-Dorland Co., New York, N.Y., 1950, p. 435).

By a cumulative foam height is meant the sum of the foam heights at the 0-, 1-, 2-, 5- and 10-minute intervals as obtained in the Ross-Miles method.

By a preformed foam is meant a foam which is generated out of contact with solids and/or liquids naturally encountered in a well bore, i.e., a foam formed out of contact with contaminants associated with a well bore environment including cuttings, oil, brine, and the like.

In a preferred embodiment of the present invention a foam is used as a circulation fluid in the cleaning of an oil well as illustrated in FIG. 1. This figure is a diagrammatic view and illustrates an arrangement of apparatus assembled for use in accordance with one aspect of the invention.

Referring now to FIG. 1, a well 10 is shown penetrating the earth into an unconsolidated oil producing formation 35. Debris has accumulated in the well bottom during the use of the well in recovering crude oil from the formation. It has choked the well bottom such that effective production is no longer possible. Using a rotary drill table 57, Kelly bar 19 and swivel 21 or other suitable well head devices, a pipe string 13 made up of a sufficient number of inter-connected pipe sections is lowered into the well by suitable means down into the upper portion of the producing zone 35.

An aqueous gas-in-fluid foam is then introduced into the well from foam generator 22 via line 11 through Kelly bar 19 and swivel 21, down string 13, out the end of the pipe string 13, and into the well bottom. If the end of string 13 is below the surface of a column of liquid, i.e., crude oil and/or water, brine, etc., or if the end of the string is penetrated into an accumulation of sand, tar etc., the foam carries the liquid or debris away in a slug flow or by entrainment up the annulus 14 of the well, out of the well via line 34 and into the foam breaker or blooie box 29 and thence via line 36 to sump 37 wherein liquid phase separation occurs yielding aqueous phase 38 and oil phase 39.

Where little or no penetration of the producing formation by the foam is desired, sufficient pressure is applied via line 28 to ensure formation of foam in generator 22 and delivery of the foam to the bottom of the well and around the turn at the end of string 13 where the natural pressure of the well or a small additional pressure via line 28, drives the foam to the surface.

Sequentially after the portion of the well bottom in the vicinity of the terminus of the pipe string 13 has been worked, and treated by the foam, the string can be lowered until all, or part, of the well bottom has been treated and/or stimulated.

For the generation of aqueous gas-in-liquid foams as in the aforedescribed embodiment, water, a detergent concentrate and if desired, a concentrated caustic solution or other suitable additive, are delivered to mixer 24 via lines 25, 26 and 27, respectively, at rates sufficient to produce in mixer 24 a foamable solution which contains in parts by weight, for each 100 parts thereof, about 0.1–1 part of an organic foaming agent, for example, the sodium salt of a linear $C_{12}$–$C_{16}$ alkylbenzene sulfonic acid mixture. Via lines 23 and 28 said foamable solution and a gas, for example air, respectively, are delivered to foam generator 22 wherein a foam having a gas to liquid volume ratio (c.f./gal.) in the range 3 to 50 is generated and delivered to the well under a pressure sufficient to circulate the foam in the well via line 11, at a rate of 10–300 feet per minute velocity up the pipe string annulus 14 as described above, i.e., at a minimum of about 5 to 100 p.s.i.g. above the bottom hole pressure. If desired, via line 30 diesel oil and the like may be introduced to line 11 for delivery (slug flow) to the well as for scrubbing. By-pass and foam recirculation lines are not shown in FIG. 1.

A variation of the preferred embodiment is illustrated in FIG. 2. In this case a well is being drilled and a suitable cutting bit, for example a rotary bit 16, is shown attached to the end of drill string 13. The foam is circulated as described above and in its transit out the end of the drill string 13 it passes through the cutting area cooling the bit and entraining cuttings, loosened solids and liquids. These are carried to the surface via the annulus as described above.

In the aforedescribed manner sand, dust, larger solids, oil, brine, fresh water and the like can be readily removed from shallow or deep wells. Surprisingly, rocks as large as 2–3 inches in diameter have been readily carried to the surface by the instant foams from depths as much as 5000 feet and deeper. By analogous means wells have been produced using the instant foams in lieu of conventional pumps. Other advantages will be clear from the examples and descriptions herein.

Gas-in-liquid foam generation is well known in the art (cf. Encyclopedia of Chemical Technology, vol. 6, Interscience Encyclopedia, Inc., N.Y. (1951); U.S. 3,212,762). Large volumes and a ready supply of foam are required for the practice of the instant invention. An eductor or venturi type nozzle arrangement followed by a few downstream in-line mixing baffles has been found to yield satisfactory gas-in-liquid foams and is the preferred mode for use herein. In the production of the subject foams, a gas such as air, nitrogen, methane, natural gas, inert exhaust gas or carbon dioxide and the like is used. Air is preferred.

For satisfactory operation in the instant invention, the foam in general must be preformed. Once formed the subject foam systems have stabilizing characteristics which render them resistant to deleterious agents and influences ordinarily encountered in well bores and which when present as an impurity during the generation of the foam may, and usually does, inhibit useful foam production.

The foams suitable for use in the instant invention are dynamic systems capable of adjusting to and survival from deleterious circumstances, for example mechanical shock, relatively high temperature and the like. In a well bore, in general, the subject foams are satisfactory circulation fluids at annular velocities as high as about 300–500 feet per minute and even at a somewhat higher velocity—possibly as much as 600 feet per minute. The subject foams are useful well circulation fluids at temperatures normally encountered in a well bore. They are stable under ordinarily minimal practical well circulation annular velocities (10–30'/min.) and even at a neglible annular velocity (0–10'/min.) for useful periods of time, for example, when used as a thermal insulator between the annulus and a central steam line in a high temperature steam treatment of a well (i.e., keeps casing cool enough to obviate excessive temperature differentials and casing failures). Preferably, in the present method, foam well bore annular flow velocities should be in the range from about 5–300 feet per minute.

Organic foaming agents are in general satisfactory for use in the instant invention provided that the agent has a Ross-Miles initial foam height of at least 10 centimeters and a cumulative foam height of at least 30 centimeters [ASTM D1173–53 (1965); also see Bureau of Mines, Monograph 11 by H. N. Dunning, J. L. Eakin, and C. J. Walker, pp. 11–14] at the concentration being used. Useful foaming agent concentrations vary depending upon the particular agent being used. In general, in parts by weight per 100 parts of foamable solution, the amount to be used is in the range from about 0.005 to 1. Larger amounts of foaming agent can also be used, but such use is relatively inefficient in view of cost, particularly at concentrations in excess of about 2–5 parts per 100.

Elastic foams are preferred herein. These foams in general are better able to endure the vicissitudes of a well bore passage and yet function effectively as a circulation fluid. In general for a given foaming agent, there is an optimum concentration range (roughly in the range when the solution contains from about 0.1 to 0.5 part per 100) at which the agent yields its most elastic foam. In this range, the change of solution surface tension per change in foaming agent concentration is relatively large. This range is also known as the reversible surface tension range. Foamable solutions having foaming agent concentrations which are intermediate concentrations within this range yield in general the most satisfactory foamed well circulation fluids.

By organic foaming agents is meant organic compounds, salts of organic compounds, and mixtures thereof, whose aqueous solutions form foam when air is bubbled through the solution. These agents are also known to the art as surface active compounds and are classified as anionic, cationic and amphoteric agents (cf. Detergents and Emulsifiers, 1966 Annual, John W. McCutcheon, Inc., also Surface Active Agents, volumes I and II, A. M. Schwartz, J. W. Perry and J. Berch, Interscience Publishers, Inc., New York (1949 and 1958)).

Anionic foaming agents are preferred for use in preparation of the subject foamed well circulation fluids. Of this class of agents, the anionic surfactants of the formula

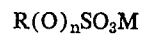

$$R(O)_nSO_3M$$

in which R represents an oleophilic radical, M represents the ammonium or an alkali metal cation and $n$ is zero or 1. The above oleophilic radical R may be a hydrocarbon radical containing from about 10 to 20 carbon atoms or a radical of the formula $R'O(CH_2CH_2O)_m$— in which R' is an oleophilic hydrocarbon radical containing from about 8 to 18 carbon atoms and $m$ is a whole number in the range from 1 to about 15. The alkylbenzene sulfonates, the paraffin sulfonates and the alkenyl-1-sulfonates, i.e., where $n$ of the formula is zero, are preferred subclasses of the agents described above for reasons of availability, performance and cost.

Of the foregoing foaming agents, the α-olefin sulfonates are particularly preferred. These materials are a complex mixture of compounds which yield a foam which is especially useful as a well circulation fluid. In general these foams are dense and made up of relatively uniform small bubbles. The small bubble sizing appears to promote foam stability and to impart to them excellent working characteristics.

By definition as used herein, by the term "α-olefin sulfonate" (AOS) is meant the broad mixture obtained at a reaction temperature in the range from about 10 to 60° C. from the reaction of an α-olefin, $RCH=CH_2$ where R is an alkyl radical of the $C_8-C_{18}$ range, with sulfur trioxide diluted by air with the product being neutralized and hydrolyzed using aqueous sodium hydroxide or an equivalent strong base at a temperature in the range from about 50 to 130° C. (See for example "Alpha-Olefins in the Surfactant Industry" by T. H. Liddicoet, the American Oil Chemists Society, November 1963, volume 40, No. 11, pp. 631–636; and "Alpha Olefin Sulfonates from a Commercial $SO_3$-Air Reactor" by D. M. Marquis et al., ibid, volume 43, No. 11, pp. 607–614 (1966).)

Foaming agents per se as described above and having the requisite Ross-Miles foam test characteristics yield satisfactory foams for use as well circulation fluids in the present invention. These agents may also be supplemented with foam boosters, if desired, as known in the art.

FIG. 3 is a diagrammatic representation of a laboratory foam testing unit in which a preformed foam can be subjected to simulated well conditions. Valves 40, 41, 42 and 43 provide control of the unit as desired. Gauges 44 and 45 indicate line pressures, and meters 46, 47 and 48 permit determination of flow rates and quantities transported. Item 49 is a sight glass for viewing the generated foam. Item 50 is a heating coil and surrounding temperature control bath. Cylinder 51 is a heavy duty glass unit in which the central delivery line 52 is analogous to a well pipe string. Detachable porous core 54 may be an oil sand core, and the annulus of cylinder 51 corresponds to a well annulus. Foam delivered via line 52 passes through core 54 or oil and tar contaminated sand as desired, or through oil or brine or mixtures thereof placed in the lower portion of cylinder 51, thence up the annulus and is exited via line 53. The effluent from line 53 is caught in a suitable vessel, i.e., a glass beaker, graduated cylinder etc. and examined for foam condition, liquid or solid, conveyed by the foam from the "well" and the like.

The following examples further illustrate the invention.

The following foam test examples were run in a laboratory test unit as described in FIG. 3 except that no core, 15, was used. Air at 50 p.s.i.g. was employed in the runs. At a flow of 10 s.c.f./hr. the system back pressure was 1.5 p.s.i.g. The bath temperature was maintained at 210° F.–225° F., and the delivered foam had a temperature in the range 142–150° F.

Example 1

A linear sodium alkylbenzene sulfonate (LAS) of the $C_{10}$–$C_{15}$ alkyl range was used to prepare a foamable solution containing about 1 volume percent of the active. The results were as follows:

| Flow rates | | | | |
|---|---|---|---|---|
| Gas, s.c.f./hr. | Liquid, gal./hr. | Volume, ratio | Pressure, p.s.i.g. | Remarks |
| 10 | 0.1 | 100 | 2 | Foam unstable, breaking ⅓ way up annulus. |
| 10 | 0.2 | 50 | 3 | Foam over (FO), i.e., full column but breaking. |
| 10 | 0.3 | 33.3 | 8 | FO, good stability. |
| 10 | 0.4 | 25 | 11 | FO, very stable. |
| 10 | 0.5 | 20 | 13 | FO, very stable. |

Example 2

In this run the ammonium salt of a sulfated linear $C_{12}$–$C_{13}$ alcohol ethoxylate [$RO(CH_2CH_2O)_nSO_3NH_4$] averaging about 3 ethoxylate units per mol was the foaming agent. At a 1% concentration the results noted were:

| Flow rates | | | | |
|---|---|---|---|---|
| Gas, s.c.f./hr. | Liquid, gal./hr. | Volume, ratio | Pressure, p.s.i.g. | Remarks |
| 10 | 0.1 | 100 | 2 | Foam unstable, breaking ¼ way up column. |
| 10 | 0.2 | 50 | 2.5 | Foam unstable, breaking ½ way up column. |
| 10 | 0.3 | 33.3 | 5 | FO, watery, unsatisfactory, slugging intermittently. |
| 10 | 0.4 | 25 | 9 | FO, fair stability. |
| 10 | 0.5 | 20 | 11 | FO, good stability. |
| 5 | 0.1 | 50 | 3.5 | Foam unstable, breaking ¼ up column. |
| 5 | 0.2 | 25 | 4.5 | FO, but breaking. |
| 5 | 0.3 | 16.7 | 9 | FO, fair stability. |
| 5 | 0.4 | 12.5 | 24 | FO, very stable. |

Example 3

This test was made as in Example 1 except that the alcohol ethoxy sulfate,

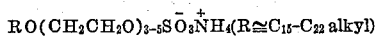
$RO(CH_2CH_2O)_{3-5}SO_3\overset{-+}{N}H_4 (R \cong C_{15}\text{-}C_{22}\text{ alkyl})$ was the foaming agent at 1% volume concentration (60% active).

| Flow rates | | | | |
|---|---|---|---|---|
| Gas, s.c.f./hr. | Liquid, gal./hr. | Volume, ratio | Pressure, p.s.i.g. | Remarks |
| 10 | 0.1 | 100 | 2 | Unsatisfactory. |
| 10 | 0.2 | 50 | 3.5 | Do. |
| 10 | 0.3 | 33.3 | 5 | Do. |
| 10 | 0.4 | 25 | 7.5 | FO, watery. |
| 10 | 0.5 | 20 | 10.5 | FO, dry stable foam. |
| 5 | 0.2 | 25 | 5 | FO, wet, poor stability. |
| 5 | 0.3 | 16.7 | 9.5 | FO, dry and good stability. |
| 5 | 0.4 | 12.5 | 14.5 | FO, more dense, satisfactory. |
| 5 | 0.5 | 10 | 16 | FO, very dense, satisfactory. |

Ten millimeters of diesel oil were introduced into unit 51 via the side port. The foam in the unit collapsed. However, with continued flow of foam (5/0.5) into unit, foam filled the column and carried out the diesel oil. The discharged foam was wet in appearance and had a strong odor of diesel oil.

Example 4

This test was run as in Example 1 except that the alcohol ethoxy sulfate,

$RO(CH_2CH_2O)_3S\overset{-+}{O_3}Na$ where R=$C_{11}$–$C_{15}$ was the organic foaming agent used at a 1% volume concentration (60% active).

| Flow rates | | | | |
|---|---|---|---|---|
| Gas, s.c.f./hr. | Liquid, gal./hr. | Volume, ratio | Pressure, p.s.i.g. | Remarks |
| 10 | 0.2 | 50 | 3.5 | FO, but breaking, unsatisfactory. |
| 10 | 0.3 | 33.3 | 5 | FO, stable. |
| 10 | 0.4 | 25 | 8 | FO, good stability. |
| 10 | 0.5 | 20 | 10 | FO, excellent stability. |
| 10 | 0.75 | 13 | 16.5 | FO, excellent stability. |
| 5 | 0.5 | 10 | 19 | FO, unsatisfactory. |
| 5 | 0.3 | 16.3 | 8.5 | FO, good stability. |
| 10 | 1.0 | 10 | 23+ | FO, excellent stability. |

Example 5

Example 3 was repeated except that the ammonium salt used was obtained from a different commercial source and had an average molecular weight of 435. (1% vol. conc. at 60% active.)

| Volume ratio | Pressure, p.s.i.g. | Remarks |
|---|---|---|
| 50 | 3.5 | FO, poor stability. |
| 33.3 | 5 | FO, fair stability. |
| 25 | 7.5 | FO, good stability. |
| 20 | 8.5 | FO, excellent stability. |
| 13 | 15 | Do. |
| 10 | 30+ | Plugged, i.e., excessive back pressure (beyond equipment limits). |

Example 6

In this test Example 1 was repeated using the LAS foaming agent except that the bath temperature was increased to 350° F. in order to illustrate temperature effects and to demonstrate foam stability at high temperatures such as are encountered when foam is used as insulation between a steam line and the well casing in a well steaming operation. The discharged foam had a temperature in the range 180–200° F.

| Flow Rates | | | | |
|---|---|---|---|---|
| Gas, s.c.f./hr. | Liquid, gal./hr. | Volume ratio | Pressure, p.s.i.g. | Remarks |
| 10 | 0.5 | 20 | 6 | FO and wet. |
| 10 | 0.75 | 13 | 12.5 | Good stable FO. |
| 10 | 1.0 | 10 | 20.5 | Very stable, 10 Ml added diesel oil did not break foam in column. |

Example 7

Example 6 was repeated except that the foaming agent used was a linear alkylbenzene sulfonic acid ($RC_6H_4SO_3H$) in which R was a $C_{11}-C_{14}$ alkyl group mixture. The average molecular weight of the acid was 360.

| Flow Rates | | | | |
|---|---|---|---|---|
| Gas, s.c.f./hr. | Liquid, gal./hr. | Volume ratio | Pressure, p.s.i.g. | Remarks |
| 10 | 0.3 | 33.3 | 3 | Foam breaks ⅓ way up column. |
| 10 | 0.4 | 25 | 4 | FO; soupy. |
| 10 | 0.5 | 20 | 5 | Wet foam; fairly stable. |
| 10 | 0.75 | 13 | 7.5 | Good, dense, stable foam. |
| 10 | 1.0 | 10 | 13.5 | Excellent stable foam. |

Example 8

Example 7 was repeated except that ¼ volume percent of methanol was added:

| Vol. ratio, A/L s.c.f./gal. | Pressure, p.s.i.g. | Remarks |
|---|---|---|
| 33.3 | 4 | Foam breaking, ⅓ up column. |
| 25 | 5.5 | FO, fair to poor. |
| 20 | 6 | Wet foam, fair stability. |
| 13 | 10 | Good, dense, stable foam. |
| 10 | 13.5 | Excellent stability. |

Example 9

Example 6 was repeated except that the agent was a linear $C_{15}-C_{20}$ alcohol sulfate, i.e., $$R O\overset{-}{S}O_3\overset{+}{Na}$$

at 1% volume concentration (60% active).

| Flow Rates | | | | |
|---|---|---|---|---|
| Gas, s.c.f./hr. | Liquid, gal./hr. | Volume ratio | Pressure, p.s.i.g. | Remarks |
| 10 | 0.3 | 33.3 | 3 | Unstable FO. |
| 10 | 0.4 | 25 | 7 | Fairly stable, dry. |
| 10 | 0.5 | 20 | 10 | Good stable foam, very light. |
| 10 | 0.75 | 13 | 15-18 | Excellent stable foam, fine texture. |
| 10 | 1.0 | 10 | 25-27 | Tendency to plug and slug. |

Example 10

Example 9 was repeated except that a ½% volume concentration (60% active) of the foaming agent was used. The bath temperature was 300° F.

| Volume ratio | Pressure, p.s.i.g. | Remarks |
|---|---|---|
| 25 | 6 | Foam breaking ½ up column. |
| 20 | 9 | FO, fair stability. |
| 13 | 11.5 | Do. |
| 10 | 13 | FO, good stability. |

Example 11

In this run the linear alkylbenzene of Example 1 was used at a ½% volume concentration. The remaining conditions were those of Example 6 (300° F. bath). Over the volume ratio 25–10 the pressure varied from 10 to 17 p.s.i.g., respectively. In this range the foam stability ranged from satisfactory to excellent.

Example 12

Example 11 was repeated except that the volume concentration of the LAS foaming agent was reduced to ¼%:

| Volume ratio | Pressure, p.s.i.g. | Remarks |
|---|---|---|
| 20 | 10 | Foam fair to poor. |
| 13 | 12.5 | Fair stability. |
| 10 | 17 | Good stability. |

When diesel oil was introduced to cylinder 51 via the side port at a rate of 1 gallon per hour, the foam column persisted and the diesel oil was carried out by the foam which broke in the discharge line 53.

Example 13

Example 3 was repeated except that a ½% volume concentration (at 60% active) and the conditions of Example 6 were used:

| Volume ratio | Pressure, p.s.i.g. | Remarks |
|---|---|---|
| 25 | 9 | FO, poor stability. |
| 20 | 10 | FO, fair stability; wet. |
| 13 | 12 | Do. |
| 10 | 14 | FO, good stability. |

Example 14

Example 7 was repeated except that a ½% volume concentration of the sulfonic acid was neutralized with sodium hydroxide:

| Volume ratio | Pressure, p.s.i.g. | Remarks |
|---|---|---|
| 25 | 7.5 | FO, fair stability. |
| 20 | 11 | FO, good stability. |
| 13 | 16 | Do. |
| 10 | 17.5 | FO, excellent stability. |

Example 15

Example 14 was repeated except that a ¼% volume concentration of acid was neutralized with sodium hydroxide.

| Volume ratio | Pressure, p.s.i.g. | Remarks |
|---|---|---|
| 20 | 8 | FO, fair stability. |
| 13 | 13 | FO, good stability. |
| 10 | 16 | FO, excellent stability, dry. |

Diesel oil was introduced at a rate of 1.0 and 0.75 gal./hr. to cylinder 51 via side port; foam effectively removed diesel oil from the unit without breaking. Foam over was wet, but it had a fair stability.

Example 16

Example 14 was repeated except that a 1% volume concentration of the alkylbenzene sulfonic acid was neutralized with excess sodium silicate (approximately 5 volume percent) to yield a solution pH of 11.0. At a volume ratio of 13 and 20 the back pressure was 11 and 23 p.s.i.g., respectively. The foam had excellent stability and carry-over.

Example 17

Example 3 was repeated except that a ¼% volume concentration of the agent and the conditions of Example 6 were used:

| Volume ratio | Pressure, p.s.i.g. | Remarks |
|---|---|---|
| 25 | 4.5 | Foam breaks ⅓ up column. |
| 20 | 5 | Foam breaks ¾ up column. |
| 13 | 6.5 | FO, poor stability. |
| 10 | 9.5 | FO, fair stability. |
| 5 | 10 | FO, good stability. |

When diesel oil introduced at 1 gal. per hr. via the side port, the foam carried the oil without breaking. The discharge foam had a poor stability.

Example 18

An ammonium α-olefin sulfonate of the $C_{15}-C_{18}$ range was used. Approximately equal amounts of the agent was of the $C_{15}$, $C_{16}$ and $C_{19}$ molecular weight. The $C_{18}$ was about ½ of this amount. The concentration was about ½ volume percent (23.4% active). The bath temperature was 300° F., the foam temperature 165–190° F.

| Volume ratio | Pressure, p.s.i.g. | Remarks |
|---|---|---|
| 100 | 1 | Unsatisfactory. |
| 50 | 1-1.5 | Foam breaking ⅛ way up. |
| 33 | 2.5 | Foam breaking ¼ way up. |
| 25 | 4-5 | Foam breaking at top. |
| 20 | 5-6 | FO, poor stability. |
| 13 | 7-8 | FO, fair stability. |
| 10 | 11 | FO, stiff, dense, good stability. |
| 6.7 | 17-20 | FO, stiff, dense, excellent stability. |

Example 19

Example 18 was repeated except that the sodium salt was substituted for the ammonium salt at ½% volume concentration (45% active).

| Volume ratio | Pressure, p.s.i.g. | Remarks |
|---|---|---|
| 100 | 1 | Unsatisfactory. |
| 50 | 2-2.5 | Foam breaking ¼ way up. |
| 33 | 4 | Foam breaking ¾ way up. |
| 25 | 6-7 | FO, light and soupy. |
| 20 | 8 | FO, fair stability. |
| 13 | 12 | FO, stiff and stable. |
| 10 | 21-25 | FO, very stiff and very stable excellent quality. |
| 6.7 | | Plugging. |

Example 20

As in Example 19 except that a ¼% concentration was used.

| Volume ratio | Pressure, p.s.i.g. | Remarks |
|---|---|---|
| 20 | 3 | FO, good stability, wet. |
| 13 | 3.5 | FO, good stable light foam. |
| 10 | 4 | FO, good stable light, dry foam. |

In view of the substantially lower back pressures and excellent foam characteristics of the alpha-olefin sulfonates (AOS), these materials are exceptional agents for the generation of low density well-circulation fluids. Additional tests were run on the AOS as follows:

Example 21

(1) A 1% solution in tap water foamed to top (100 ml. solution in 600 ml. beaker) in mechanical mixing test yielding a very fine dense foam having a slow drain.

(2) A 1% solution in 3% salt water foamed to ⅞ height in beaker test and also yielded a very fine dense foam.

(3) A 1% solution in 5% phosphoric acid foamed to ¾ height yielding a fine dry dense foam.

These data demonstrate that AOS foams have an excellent resistance to brines and acids.

Example 22

In the unit of FIG. 3 a bead-pack was substituted for core 53. The beads were coated with 13.5° API gravity crude oil. As in Example 7 foam generated from a 1% solution of sulfonic acid and passed through the bead-bed. The pH of the solution was 1. At a volume ratio of 13 and a 5 p.s.i.g. back pressure as in Example 7, a good dense stable foam was formed. The first foam through the bed was streaked black with crude oil. After two minutes the fluid had passed up the annulus and out the discharge port. It had the appearance of a poor emulsion. After three minutes the foam appeared to be breaking in the bead pack, and some liquid was discharged. After five minutes a definite and fairly stable column of foam was passing up the annulus and out the discharge line. After 8 minutes the major portion of the beads in the pack had been cleaned.

Example 23

As in Example 22 a bead pack was subjected to a foam cleaning except that the sulfonic acid was neutralized with sodium hydroxide to a solution pH of about 11. At a volume ratio of 13 the back pressure was 3.5 p.s.i.g. The results were as follows:

| Time, Min.: | Remarks |
|---|---|
| 1 | Effluent, dark brown with streaks of black—first foam through. |
| 4 | Foam very light tan, no oil streaks—mixture of emulsion and fairly stable foam. |
| 5 | Foam substantially white, bead-pack clean; some steam. |
| 10 | Total of 500 ml. foam solution through pack. |

Example 24

Foam was used to clean and to stimulate an oil well which had been shut-in because of excessive sand accumulation. This well had produced from the Amnicola and Tulare sands through a sand packed 6⅝" liner set from 961 to 412 feet. It had been shut-in for about 1.5 years.

Using a foamable aqueous solution containing 1 volume percent of a sulfonate type detergent foaming agent and air, a gas-in-liquid foam was generated at the wellhead and circulated in the well substantially as illustrated in FIG. 1. The well bore was cleared of fill material which was carried out of the well by the circulated foam. In addition the liner perforations were scratched for approximately three hours as a further aid in opening up the liner perforations. The well was then steamed, and foam was used to sweep out the matter loosened by the scratching and steaming.

As a result of the foam cleanout, the well had an initial production rate of about 50 barrels per day (b./d.). Over a five-week period production declined to 5 b./d. Loss of production at this time was due to accumulated sand fill.

The well was again cleaned with foam and the restored production was recovered using the foam as the lifting means. Intermittent and continuous production of the well by foam was demonstrated as being feasible with oil recovery varying in the range 38-74 b./d. A bottom hold pressure and temperature of 35 p.s.i.g. and 165° F. was noted. The well was subsequently returned to production by a conventional rod pump. After about a six months' period of production the well was checked. Fluid level measurements indicated fluid at pump and no fill. The production rate was satisfactory.

In driving foam down a well, in accordance with the present invention, a surface pressure slightly higher, i.e., 5 to 65 lbs. p.s.i. than the well bottom hole pressure is required. Driving pressure of the order of 500 to 2000 lbs. per square inch above bottom hole pressure are in general operable pressures. However, in order to avoid undesirable foam injection into the drilled formations, driving pressures of the order of 5-200 lbs. above bottom hole pressure are preferable.

The foregoing examples demonstrate that the above described preformed foams are effective well circulation fluids.

As the range of embodiments of this invention is wide and may appear to be widely different, yet not depart from the spirit and scope thereof, it is to be understood that this invention is not limited to specific embodiments thereof, except as defined in the appended claims.

We claim:

1. Method of circulating in a well bore a foam selected from the group consisting of aqueous gas-in-liquid foams which comprises preforming said foam and introducing it into the annulus or a pipe string in said well at a pressure at least sufficient to drive said foam down said annulus or pipe string and less than about 2000 p.s.i. above the bottom hole pressure of said well, wherein said foam is produced from a gas and a foamable aqueous solution containing in parts by weight per 100 parts of solution, from about 0.005 to 10 parts of an agent selected from the group consisting of organic foaming agents having a Ross-Miles initial foam height of at least 10 centimeters and a cumulative foam height of at least 30 centimeters, said foam having a gas-to-liquid volume ratio, standard cubic feet per gallon, respectively, in the range from about 3 to 50, thereby circulating said foam in said well at an annular velocity less than about 600 feet per minute.

2. The method as in claim 1 wherein said annular velocity is less than about 300 feet per minute and wherein said driving pressure is less than about 250 p.s.i. above said bottom hole pressure.

3. The method as in claim 2 wherein said foam is used to circulate solids from a well.

4. The method as in claim 2 wherein said foam is used as a drilling fluid.

5. The method as in claim 2 wherein said foam is used as a means to recover petroleum from said well.

6. The method as in claim 2 wherein said foam is introduced into the annulus of said well while steam is being concurrently delivered to the well bottom via a pipe string, thereby maintaining the casing of said well at a lower temperature than said steam.

7. The method as in claim 2 wherein said foam is circulated at an annular velocity in the range from about 5 to 300 feet per minute.

8. The method as in claim 1 wherein said foaming agent concentration is in the reversible surface tension range.

9. The method as in claim 1 wherein said foaming agent is an anionic surfactant.

10. In the use of a gas-in-liquid foam in a well, the improvement which comprises generating said foam out of contact with contaminants associated with the well bore environment of said well wherein said foam is produced from a gas and a foamable aqueous solution containing in parts by weight per 100 parts of solution, from about 0.005 to 10 parts of an agent selected from the group consisting of organic foaming agents having a Ross-Miles initial foam height of at least 10 centimeters and a cumulative foam height of at least 30 centimeters, said foam having a gas-to-liquid volume ratio, standard cubic feet per gallon, respectively, in the range from about 3 to 50, and wherein said use is at a foam circulation annulus velocity of less than about 300 feet per minute.

11. Method of circulating in a well bore a foam selected from the group consisting of aqueous gas-in-liquid foams which comprises preforming said foam and introducing it into the annulus or a pipe string in said well at a pressure at least sufficient to drive said foam down said annulus or pipe string and less than about 2000 p.s.i. above the bottom hole pressure of said well, wherein said foam is produced from gas and an aqueous solution containing in parts by weight per 100 parts of solution from about 0.005 to 10 parts of an agent of the formula $$R(O)_nSO_3M$$

wherein M is sodium or ammonium and $n$ is zero or 1, wherein R represents an oleophilic radical selected from the group consisting of R' and R'' radicals in which R' is a hydrocarbon radical containing from about 10 to 20 carbon atoms and R'' is a radical of the formula $$R'''O(CH_2CH_2O)_m$$

wherein R''' is a hydrocarbon radical containing from about 8 to 18 carbon atoms, wherein $m$ is a number in the range from 1 to about 15, said foam having a gas-to-liquid volume ratio, standard cubic feet per gallon, respectively, in the range from about 3 to 50, thereby circulating said foam in said well at an annular velocity less than about 600 feet per minute.

12. The method of claim 11 wherein said annular velocity is less than about 300 feet per minute.

13. The method as in claim 12 wherein said foam is used to remove solids from said well.

14. The method as in claim 12 wherein said foam is used as a drilling fluid.

15. The method as in claim 12 wherein said foam is used as a means to recover petroleum from said well.

16. The method as in claim 12 wherein said foam is introduced into the annulus of said well while steam is being concurrently delivered to the well bottom via a pipe string, thereby maintaining the casing of said well at a lower temperature than said steam.

17. The method as in claim 11 wherein said foam is circulated at an annular velocity in the range from about 5 to 300 feet per minute.

18. The method as in claim 11 wherein said foaming agent concentration is in the reversible surface tension range.

19. The method as in claim 11 wherein said $n$ is zero and R is selected from the group consisting of alkylbenzene and alkyl radicals.

20. In the use of a gas-in-liquid foam in a well, the improvement which comprises generating said foam out of contact with contaminants associated with the well bore environment of said well wherein said foam is produced from a gas and a foamable aqueous solution containing in parts by weight per 100 parts of solution, from about 0.005 to 10 parts of an α-olefin sulfonate selected from the group consisting of $C_{10}$–$C_{20}$ α-olefin sulfonates and mixtures thereof, said foam having a gas-in-liquid volume ratio, standard cubic feet per gallon, respectively, in the range from about 3 to 50.

21. The method as in claim 20 wherein said foam is circulated in said well at an annular velocity in the range from about 5 to 300 feet per minute.

22. The method as in claim 21 wherein said foam is used to remove solids from said well.

23. The method as in claim 21 wherein said foam is used as a drilling fluid.

24. The method as in claim 21 wherein said foam is used as a means to recover petroleum from said well.

25. The method as in claim 20 wherein said foam is introduced into the annulus of said well while steam is being concurrently delivered to the well bottom via a pipe string, thereby maintaining the casing of said well at a lower temperature than said steam.

26. The method as in claim 20 wherein said foaming agent concentration is in the reversible surface tension range.

27. The method as in claim 11 wherein said agent is of the formula $RSO_3M$.

28. The method as in claim 11 wherein said agent is of the formula $R'''O(CH_2CH_2O)_mSO_3M$.

References Cited

UNITED STATES PATENTS

| | | | |
|---|---|---|---|
| 3,130,798 | 4/1964 | Schramm et al. | 175—69 |
| 3,185,634 | 5/1965 | Craig et al. | 166—9 |
| 3,221,813 | 12/1965 | Closmann et al. | 166—40 X |
| 3,229,777 | 1/1966 | Rogers | 252—8.5 X |
| 3,269,468 | 8/1966 | Phansalkar et al. | 252—8.5 X |
| 3,273,643 | 9/1966 | Billings et al. | 175—69 X |
| 3,313,362 | 4/1967 | Schneider | 175—71 |
| 3,330,346 | 7/1967 | Jacobs et al. | 166—9 |
| 3,373,805 | 3/1968 | Boberg et al. | 166—40 X |
| 3,391,750 | 7/1968 | Zika | 175—69 X |
| 3,412,793 | 11/1968 | Needham | 166—10 X |

STEPHEN J. NOVOSAD, Primary Examiner

U.S. Cl. X.R.

166—312, 314; 175—69